US008782600B2

(12) United States Patent
Hicks et al.

(10) Patent No.: US 8,782,600 B2
(45) Date of Patent: Jul. 15, 2014

(54) SYSTEM AND METHOD FOR EXECUTING TEMPORARY PROCESSING AGENTS

(75) Inventors: Scott D. Hicks, Underhill Center, VT (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 13/425,715

(22) Filed: Mar. 21, 2012

(65) Prior Publication Data

US 2012/0180075 A1 Jul. 12, 2012

Related U.S. Application Data

(63) Continuation of application No. 11/324,877, filed on Jan. 3, 2006, now Pat. No. 8,196,098.

(51) Int. Cl.
*G06F 9/44* (2006.01)

(52) U.S. Cl.
USPC ............................ 717/114; 717/110; 717/115

(58) Field of Classification Search
USPC ......................................... 717/110, 114, 115
See application file for complete search history.

(56) References Cited

U.S. PATENT DOCUMENTS

| | | | |
|---|---|---|---|
| 5,708,811 A | 1/1998 | Arendt et al. | |
| 5,752,032 A | 5/1998 | Keller et al. | |
| 5,764,974 A | 6/1998 | Walster et al. | |
| 6,112,025 A | 8/2000 | Mulchandani et al. | |
| 6,182,278 B1 | 1/2001 | Hamada et al. | |
| 6,339,839 B1 | 1/2002 | Wang | |
| 6,907,597 B1 | 6/2005 | Mamona et al. | |
| 7,627,851 B2 | 12/2009 | Lotter | |
| 2002/0066072 A1 | 5/2002 | Crevatin | |
| 2003/0046673 A1 | 3/2003 | Copeland et al. | |
| 2004/0044990 A1 | 3/2004 | Schloegel et al. | |
| 2007/0157189 A1 | 7/2007 | Hicks et al. | |

OTHER PUBLICATIONS

Office Action (Mail Date Jan. 25, 2010) for U.S. Appl. No. 11/324,877, filed Jan. 3, 2006.
Amendment filed Apr. 26, 2010 in response to Office Action (Mail Date Jan. 25, 2010) for U.S. Appl. No. 11/324,877, filed Jan. 3, 2006.
Office Action (Mail Date Jul. 7, 2010) for U.S. Appl. No. 11/324,877, filed Jan. 3, 2006.
Amendment filed Oct. 6, 2010 in response to Office Action (Mail Date Jul. 7, 2010) for U.S. Appl. No. 11/324,877, filed Jan. 3, 2006.
Final Office Action (Mail Date Oct. 26, 2010) for U.S. Appl. No. 11/324,877, filed Jan. 3, 2006.
Amendment filed Dec. 27, 2010 in response to Final Office Action (Mail Date Oct. 26, 2010) for U.S. Appl. No. 11/324,877, filed Jan. 3, 2006.
Notice of Allowance (Mail Date Feb. 2, 2012) for U.S. Appl. No. 11/324,877, filed Jan. 3, 2006.

*Primary Examiner* — Li B Zhen
*Assistant Examiner* — Hang Pan
(74) *Attorney, Agent, or Firm* — Schmeiser, Olsen & Watts, LLP; John R. Pivnichny (57) ABSTRACT

A method and system for managing temporary processing agents. Second executable code is selectively loaded into an empty routine which converts the empty routine to a populated routine in a first space. A super agent includes first agent code that includes first executable code, third agent code that includes third executable code and is located contiguous to the first agent code within a contiguous space within the super agent, and the empty routine consisting of non-executable code in the first space within the super agent external to the contiguous space.

15 Claims, 5 Drawing Sheets

SYSTEM AND METHOD FOR EXECUTING TEMPORARY PROCESSING AGENTS

CROSS REFERENCES TO RELATED APPLICATIONS

This application is a continuation application claiming priority to Ser. No. 11/324,877, filed Jan. 3, 2006.

Copending U.S. patent application Ser. No. 11/258,659, entitled "SYSTEM AND METHOD FOR CONTROLLING THE SCOPE OF SCRIPT LIBRARY CODE" filed Oct. 26, 2005 is assigned to the same assignee hereof and contains subject matter related, in certain respect, to the subject matter of the present application. The above-identified patent application is incorporated herein by reference.

BACKGROUND OF THE INVENTION

1. Technical Field of the Invention

This invention relates to processing agents. More particularly, it relates to the use of short-lived, on-demand processing agents within scheduled processing agents.

2. Background Art

There is a need in the art for a system and method for managing a pervasive agent that must be run on demand, either once or multiple times over a defined period. This agent may need to run daily, weekly, or as part of end-user adhoc processing. Such pervasive agents need to run in a controlled and/or sequenced manner to avoid conflicts and unintended side effects. Pervasive agents are broad in scope in terms of data affected and must be controlled and sequenced in proper logical order, else conflicts and unintended side effects, such as overlapping and overwriting each other's work, occur.

SUMMARY OF THE INVENTION

A system, method, and computer program product for managing temporary processing agents by providing a first routine as an empty routine in an agent including first executable code, the empty routine consisting of non-executable code; selectively loading second executable code to the first routine, converting the empty routine to a populated routine; operating a code element to issue a call to the first routine; responsive to the first routine being a populated routine, executing the second executable code; and returning control to the code element.

Other features and advantages of this invention will become apparent from the following detailed description of the presently preferred embodiment of the invention, taken in conjunction with the accompanying drawings.

DETAILED DESCRIPTION OF THE BEST MODE

Figure 1:
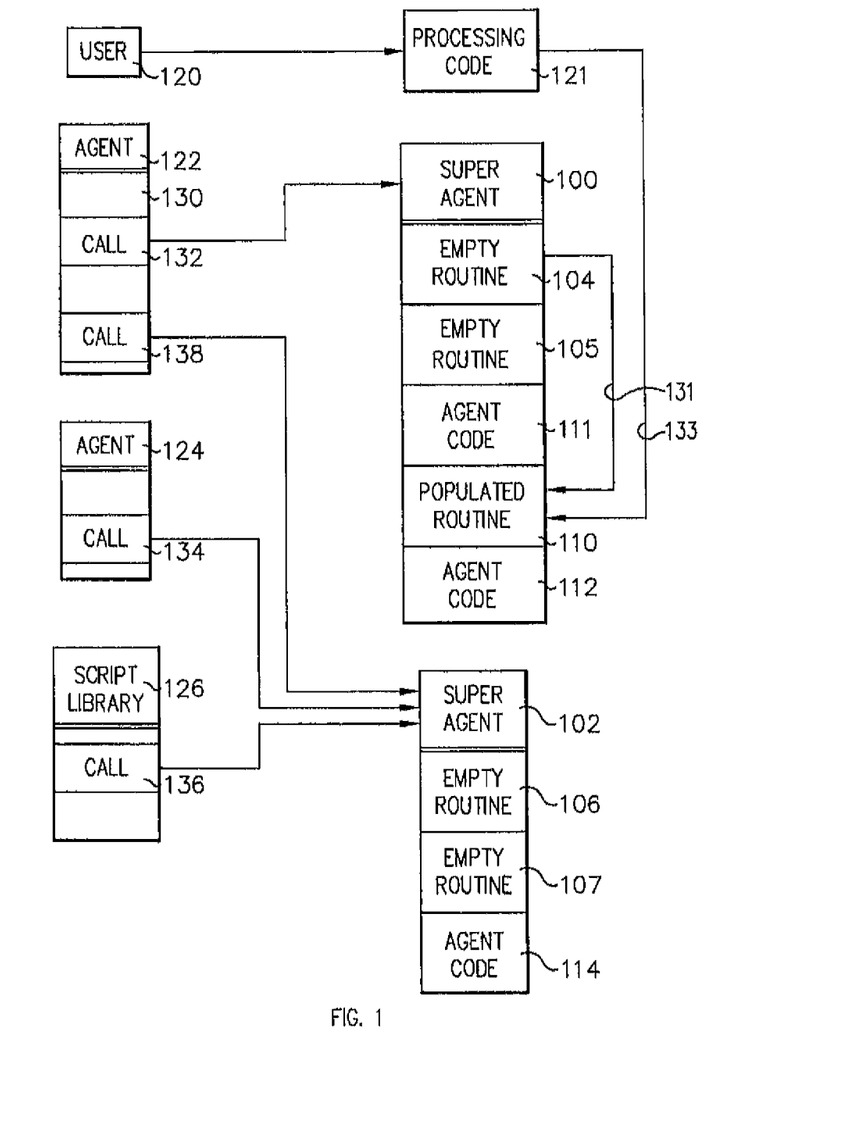
FIG. 1 is a high level logic diagram illustrating calls to super agents containing empty and populated routines in accordance with a first embodiment of the invention.
Figure 2:
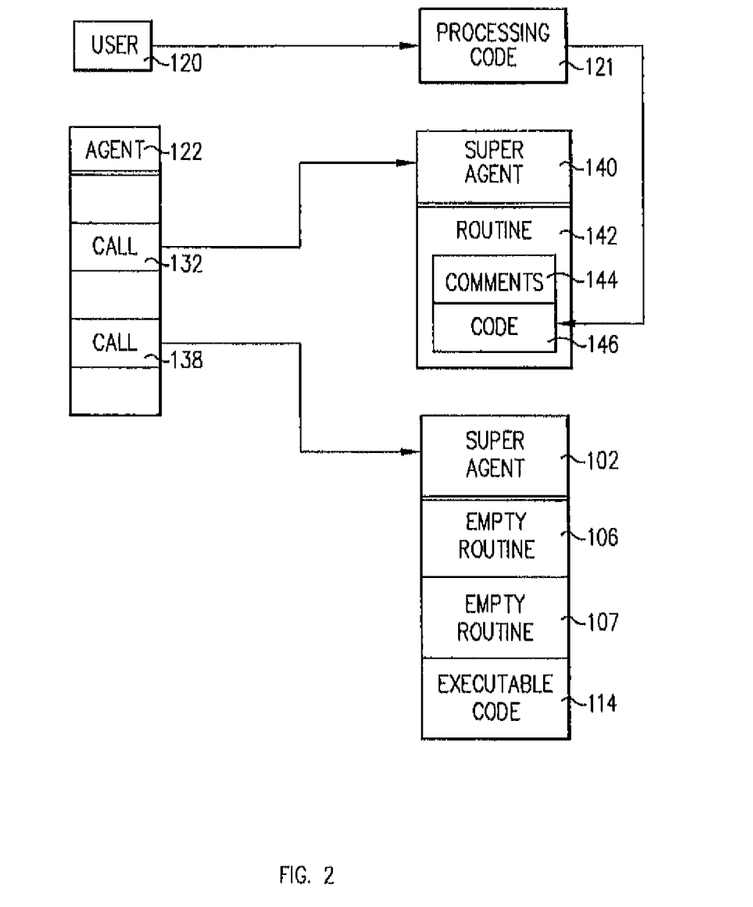
FIG. 2 is a high level logic diagram illustrating calls to super agents containing empty routines and executable code in accordance with a second exemplary embodiment of the invention.

Referring to FIGS. 1 and 2, in accordance with a preferred embodiment of the invention, short-lived on-demand processing agents 100, 102 execute responsive to calls 132, 138 from within a scheduled processing agent 122.

In accordance with preferred embodiments of the present invention, a series of generic on-demand processing agents 100, 102 are provided which have calls 132, 134, 136, 138 to them strategically embedded within script libraries 126 and other agents 122, 124.

These generic on-demand processing agents 100, 102 normally run when called and do nothing at all when populated only with empty routines 104, 105, 106, 107. Alternatively, call 132 to agent 100 may include agent code 111, 112 which does run when agent 100 is called. Thus, in this situation, agent 100 is a super agent. A super agent 100 is an agent including executable code which may include within it other agents which may be called from code internal or external to the super agent. However, such as when adhoc or 'on-demand' processing is required, these agents 100 may have a normally empty routine 104 loaded with processing code 121 to become a populated routine 110 that continues to run as long as needed. This varies from application to application (and project to project) and is at the discretion of the project manager, customer, and database programmer.

Call 132 is shown directed to super agent 100, which includes agent code 111, 112 and will normally result in executing agent code 111 and 112. If empty routine 104 has been populated with code 121 to become populated routine 110 and repositioned as shown in sequential order between agent code elements 111 and 112, a call 132 to super agent 100 will result in execution of code 111, 110, and 112, in that order.

Figure 4:
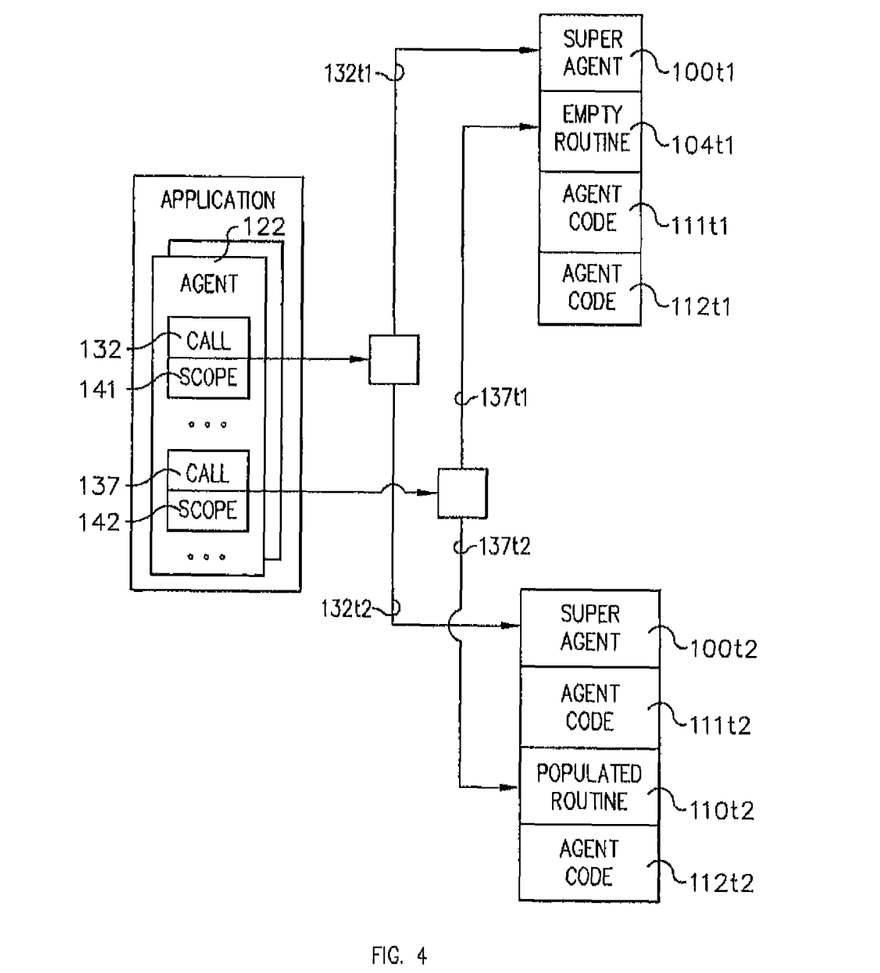
FIG. 4 is a high level logic diagram illustrating calls to empty and populated routines within super agents.

Referring to FIG. 4, super agent 100 is shown at successive times t1 and t2. Empty routine 104t1 is populated and repositioned between agent code 111t2 and 112t2 as populated routine 110t2. A call 132 is directed as is represented by line 132t1 to super agent 100t1 at time t1, and to super agent 100t2 at time t2. Call 137 is directed to empty routine 104t1 as is represented by line 137t1 at time t1, resulting in no processing occurring, and will be directed to populated routine 110t2 as is represented by line 132t2 resulting in processing of the executable code just in routine 110t2. A call 132t1 to super agent 100t1 will result in sequential execution of agent code 111t1 and 112t1, and a call 132t2 to super agent 100t2 will result in sequential execution of code 111t2, 110t2 and 112t2.

A call 132 which is "strategically embedded" is a call which provides improved maintainability and reliability of an overall system by being placed in its proper logical location within the code 130 of the calling application 122. Such calls are placed by the programmer to guarantee proper sequential execution. Similarly, populated routines may be repositioned strategically within agent code so as to execute in proper logical order.

In an exemplary embodiment of the invention, an Ethernet migration (EMM) project requires that update processing be done, sometimes weekly, sometimes daily, and sometimes on some other schedule or on demand (adhoc). Under some circumstance, it may be required to change the processing (such as update) rules and that will require that code 121 be executed which has not previously been written but under conditions (such as monthly, or nightly, and so forth) which are the same as other agents or routines within super agent 100.

In this example, a block of code which does nothing, that is, an empty routine 104, 105 is created and preferably positioned at the top of the agent 100, and then moved to a logical location between code 111 and 112 in the agent code 100 when populated with code 121 to be executed in response, for example, to on-demand, or ad-hoc, processing (for example, call 132). An empty routine is a separate program or agent that is normally devoid of executable code, containing only comments, and is called by another agent.

When it is needed to execute some new processing code 121, an empty routine 104 is selected by the user 120 (programmer) and populated with the code required for executing a new processing requirement. A response to a request for new on-demand processing, for example, is coded into an empty routine 104, and then strategically embedded into the agent by moving that routine into a logical position 110, as is represented by line 131.

In accordance with copending application END920040031, this newly populated routine 110 is enabled by passing scope based parameters in call 132, which are used to define which functions and procedures are executed. In this manner, the new routine 110 is isolated, controlled, and stable in that it integrates within the balance of the program 111, 112 a routine 110 which is isolated and identified, in this example, as run-once-on-demand code.

In the event that the new routine 110 is not removed from the agent 100, it will not execute when at least one prerequisite condition (such as may defined by a scope based parameter passed to routine 110 in call 132) is not met.

In accordance with an exemplary embodiment of the invention, a newly populated routine is enabled, isolated, and controlled by the agent being scheduled and enabled for execution with a Lotus Notes Designer application.

Referring now to FIG. 2 in connection with Tables 1 and 2, an agent 122 includes code for initializing an adhoc only super agent information update (agent) 140. In this example Table 1 shows a call at lines 31 and 32 to "AGNT:On Demand Processing", which is Table 2 before being populated with executable code, and as Table 3 thereafter, lines and 4-34.

TABLE 1

ADHOC ONLY: EMM SUPER AGENT INFORMATION UPDATE (AGENT4): INITIALIZE

| | |
|---|---|
| 01 | ADHOC ONLY: EMM Super Agent Information Update(Agent):Initialize |
| 02 | Sub Initialize |
| 03 | 'Declarations |
| 04 | Dim session As New NotesSession |

TABLE 1-continued

ADHOC ONLY: EMM SUPER AGENT INFORMATION UPDATE (AGENT4): INITIALIZE

| | |
|---|---|
| 05 | Dim this_db As NotesDatabase |
| 06 | Dim config_view As NotesView |
| 07 | Dim config_doc as NotesDocument |
| 08 | Dim collection As NotesDocumentCollection |
| 09 | Dim server As String |
| 10 | Dim pathFN As String |
| 11 | 'Initializations |
| 12 | Set this_db - session.CurrentDatabase |
| 13 | Set config_view = this_db.GetView("LookupAgentSettings") |
| 14 | Call config_view.Refresh |
| 15 | Set collection = config_view.GetAllDocumentsByKey ("ADHOC AGNT:Weekly Agent Group") |
| 16 | Set config_doc = collection.GetFirstDocument |
| 17 | 'Loop through all active configuration documents |
| 18 | While Not(config_doc is Nothing) |
| 19 |   'Get server and pathname from config |
| 20 |   server=config_doc.ServerName(0) |
| 21 |   If server = "" Then |
| 22 |     pathFN=config_doc.LocalDatabasePathFN2(0) |
| 23 |   Else |
| 24 |     pathFN=config_doc.DatabasePathFN2(0) |
| 25 |   End If |
| 26 |   'Open the database and run the proper agent |
| 27 |   Dim instance_db As New NotesDatabase("","") |
| 28 |   Dim instance_agent As NotesAgent |
| 29 |   Dim instance_agent2 As NotesAgent |
| 30 |   Call instance_db.Open(server,pathFN) |
| 31 |   Set instance_agent2 = instance_db.GetAgent("AGNT:On Demand Processing") |
| 32 |   Call instance_agent2.Run |
| 33 |   'Set instance_agent = instance_db.GetAgent '("AGNT:Weekly Agent Group") |
| 34 |   'Call instance_agent.Run |
| 35 |   Call instance_db.Close |
| 36 |   Set config_doc = collection.GetNextDocument (config_doc) |
| 37 | Wend |
| 38 | End Sub |

TABLE 2

AGENT3: EMPTY ROUTINE

| | |
|---|---|
| 01 | AGNT:On Demand Processing(Agent):Initialize |
| 02 | Sub Initialize |
| 03 | 'This agent does what it needs to, when it needs to do ' it. |

TABLE 3

AGENT3: POPULATED WITH EXECUTABLE CODE FOR ON DEMAND PROCESSING

| | |
|---|---|
| 01 | AGNT:On Demand Processing(Agent):Initialize |
| 02 | Sub Initialize |
| 03 | 'This agent does what it needs to, when it needs to do ' it. |
| 04 | Dim VN_session as New NotesSession |
| 05 | Dim VW_EMMlookup As NotesView 'Above added for script library |
| 06 | Dim VW_EMMlookup2 as NotesView 'Above added for script library |
| 07 | Dim DB_EMM As NotesDatabase |
| 08 | Dim DOC_EMM As NotesDocument |
| 09 | Set DB_EMM=VN_session.CurrentDatabase |
| 10 | Set VW_EMMlookup = DB_EMM GetView("VW_LookupMachines") |
| 11 | Set VW_EMMlookup2 = DB_EMM GetView("VW_LookupPrinters") |
| 12 | Set VW_EMMlookup3 = DB_EMM.GetView("VW_LookupPorts") |
| 13 | Call VW_EMMlookup.Refresh |
| 14 | Call VW_EMMlookup2.Refresh |

TABLE 3-continued

AGENT3: POPULATED WITH EXECUTABLE
CODE FOR ON DEMAND PROCESSING

```
15      Call VW_EMMlookup3.Refresh
16      Set DOC_EMM=VW_EMMlookup.GetFirstDocument
17      While Not(DOC_EMM Is Nothing)
18          Set VN_tempdoc=VW_EMMlookup.GetNextDocument(DOC_EMM)
19          If Cstr(DOC_EMM.FN_EthernetDate(0))<> "" Then
20              DOC_EMM.FN_EthernetDate=Cdat
                (DOC_EMM.FN_EthernetDate(0)
21          End If
22          Call DOC_EMM.Save(True,False,True)
23          Set DOC_EMM=VN_tempdoc
24      Wend
25      Set DOC_EMM=VW_EMMloookup2.GetFirstDocument
26      While Not (DOC_EMM is Nothing)
27          Set
VN_tempdoc=VWK_EMMlookup2.GetNextDocument(DOC_EMM)
28          If Cstr(DOC_EMM.FN_EthernetDate(0) <> == Then
29              DOC_EMM.FN_EthernetDate=
                Cdat(DOC_EMM.FN_EthernetDate(0))
30          End If
31          Call DOC_EMM.Save(True,False,True)
32          Set DOC_EMM=VN_tempdoc
33      Wend
34  End Sub
```

Figure 3:
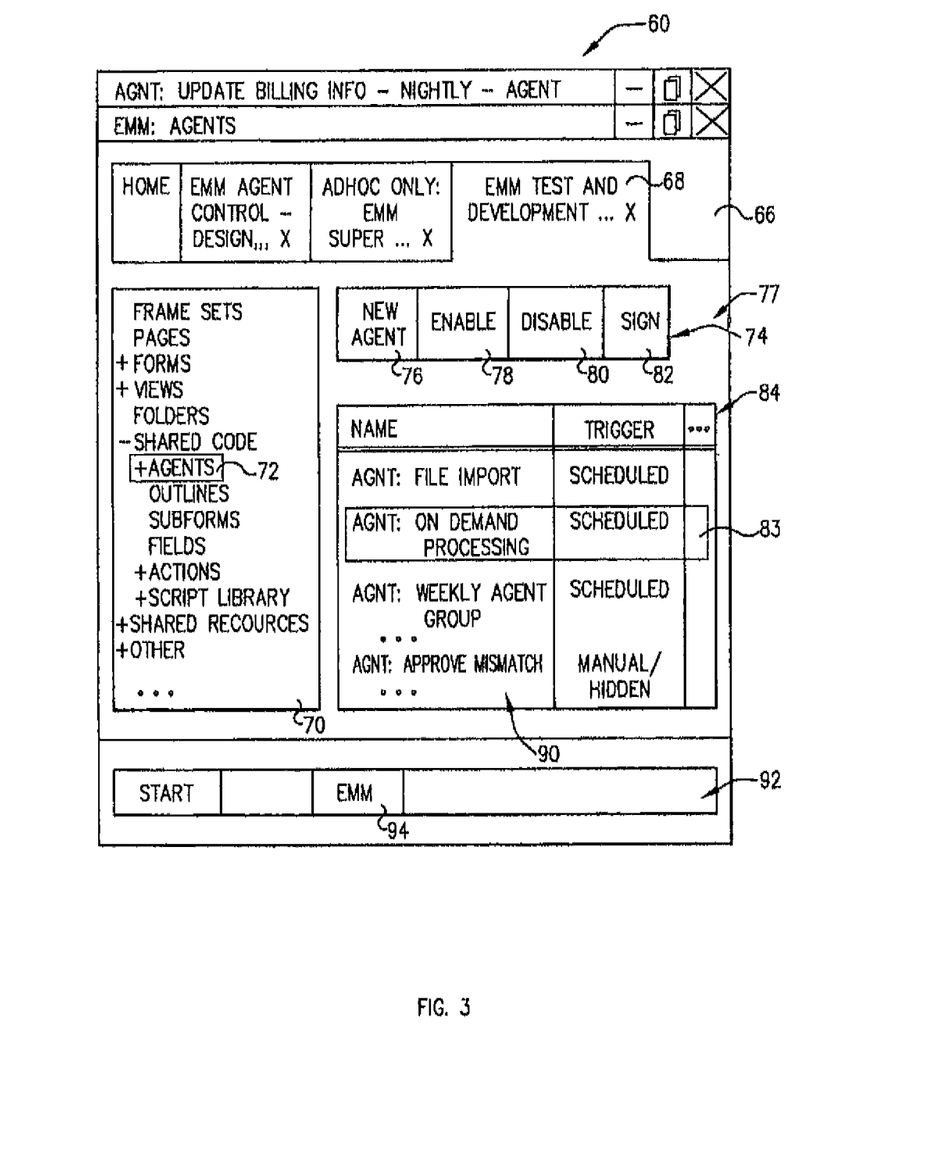
FIG. 3 is an example of a user interface of an application including agents and super agents.

Referring to FIG. 3, a user interface 60 provides to a programmer the ability to access agents and libraries for an exemplary application, thus enabling programmer 120 to populate a normally empty routine 104 with processing code 121.

Selection of button 94 from application bar 92 brings up under tab 68 table of contents (TOC) 70. Selection of agents 72 from TOC 70 brings into window 60 tool bar 74 and agent listing 90, with field headings 84 identifying agent name and triggers (scheduled, manual/hidden, and so forth) for the agents in the application. Tool bar 74 provides new agent 76, enable 78, disable 80 and sign 82 processes for selection by a user in working with a selected application 68. Selection of agent 83 will load to the UI 60, in this example, the material set forth above in Table 2, which programmer 120 may then work with to populate an empty routine 104 with processing code 121 as previously described.

Figure 5:
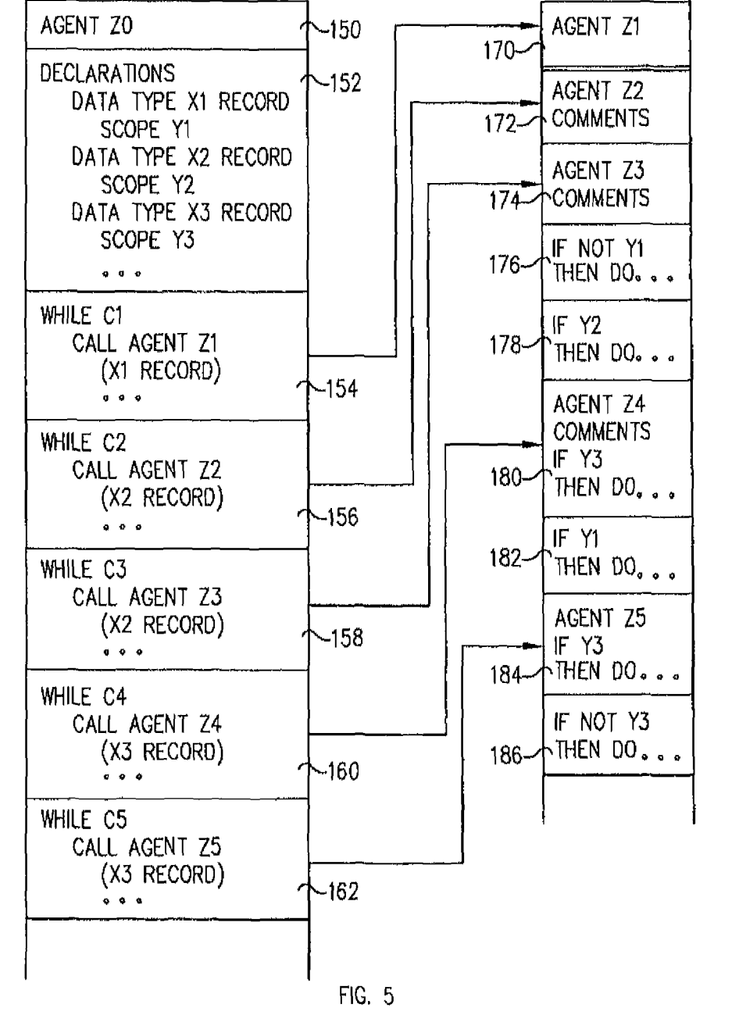
FIG. 5 is a schematic representation of agent code showing calls to empty and populated routines within a super agent.

Referring to FIG. 5, several calls are illustrated from agent Z0 150 to super agent Z1 170. Agent Z0 150 includes declarations code 152, and calls C1 154, C2 156, C3 158, C4 160, and C5 162 to agent Z1 170, agent Z2 172, agent Z4 180, and agent Z5 186, respectively. Declarations 152 set up datatypes X1 Record including a scope parameter Y1, X2 Record including a scope parameter Y2, and X3 Record including a scope parameter Y3. Agent Z2 172 and Agent Z3 174 are examples of empty routines including only comments, and no executable code. Calls 158 and 160 from agent Z0 150 to agents Z2 172 and Z3 174 will result in no processing. Agents Z4 180 and Z5 184 are examples of normally empty routines which have been populated by executable code such that a call 160 to agent Z4 180 and call 162 to agent Z5 184 will result in execution of code identified by their IF/THEN statements subject to scope Y3 being true. Code segments 176, 178, 182, 186 are examples of agent Z1 code that will execute or not based upon scope parameters Y1, Y2, and Y3 testing true or not true in their respective IF/THEN statements. Agent Z4 180 and Z5 184 code has been strategically positioned within Agent Z1 170 code segments 178, 182, 186, such that a call 154 to super agent Z1 170 will result in code 176, 178, 180, 182, 184, 186 executing in sequence subject to their respective scope parameters evaluating true.

Advantages Over the Prior Art

It is an advantage of the invention that there is provided an improved system and method for processing scheduled agents.

Alternative Embodiments

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a non-transitory computer-readable medium providing program code for use by or in connection with a computer or any instruction execution system. For the purposes of this description, a non-transitory or computer-readable medium can be any apparatus that can store the program for use by or in connection with the instruction execution, system, apparatus, or device.

The medium can be an electronic, magnetic, optical, electromagnetic, or semiconductor system (or apparatus or device). Examples of a non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Accordingly, the scope of protection of this invention is limited only by the following claims and their equivalents.

We claim:

1. A method for managing temporary processing agents, said method comprising:
   selectively loading, by a processor of a computer system, second executable code into an empty routine which converts the empty routine to a populated routine in a first space, wherein a super agent comprises first agent code that includes first executable code, third agent code that includes third executable code and is located contiguous to the first agent code within a contiguous space within the super agent, and the empty routine consisting of non-executable code in the first space within the super agent external to the contiguous space; and
   after said selectively loading, said processor repositioning the populated routine between the first agent code and the third agent code to sequentially and contiguously order the first agent code, the populated routine, and the third agent code within the super agent to ensure that a call from a code element to the super agent results in a sequentially ordered execution of the first executable code, the second executable code, and the third executable code.

2. The method of claim 1, said method further comprising:
   after said repositioning, said processor implementing said super agent receiving the call from the code element;
   responsive to said receiving the call from the code element, said processor implementing said super agent executing code comprising, and in a sequential ordering of, the first executable code, the second executable code, and the third executable code; and
   after said executing code, said processor implementing said super agent returning control to the code element.

3. The method of claim 1, wherein the code element provides in the call a scope parameter, and wherein the scope parameter is defined in a data type created by the code element to include the scope parameter and other parameters.

4. The method of claim 3, wherein the second executable code includes an IF/THEN routine responsive to the scope parameter for determining whether to execute a portion of the second executable code defined by the IF/THEN routine.

5. The method of claim 1, said method further comprising:
   said processor presenting a user interface to a programmer, said presented user interface comprising a window that includes an application bar;
   responsive to selection by the programmer of a button in the application bar, said processor displaying a table of contents in the window concurrently with the application bar, said table of contents listing a plurality of options for selection by the programmer;
   responsive to selection by the programmer of an agents option in the table of contents, said processor displaying a listing of agents in the window concurrently with the application bar and the table of contents; and
   responsive to selection by the programmer of an agent specific to the second executable code in the listing of agents, said processor displaying the second executable code in the window and subsequently receiving the second executable code from the programmer to perform said selectively loading the second executable code into the empty routine which results in said converting the empty routine to the populated routine in the first space.

6. A computer program product, comprising a computer readable hardware storage device having computer readable program instructions stored therein, said computer readable program instructions configured to be executed by a processor of a computer system to implement a method for managing temporary processing agents, said method comprising:
   selectively loading, by a processor of a computer system, second executable code into an empty routine which converts the empty routine to a populated routine in a first space, wherein a super agent comprises first agent code that includes first executable code, third agent code that includes third executable code and is located contiguous to the first agent code within a contiguous space within the super agent, and the empty routine consisting of non-executable code in the first space within the super agent external to the contiguous space; and
   after said selectively loading, said processor repositioning the populated routine between the first agent code and the third agent code to sequentially and contiguously order the first agent code, the populated routine, and the third agent code within the super agent to ensure that a call from a code element to the super agent results in a sequentially ordered execution of the first executable code, the second executable code, and the third executable code.

7. The computer program product of claim 6, said method further comprising:
   after said repositioning, said processor implementing said super agent receiving the call from the code element;
   responsive to said receiving the call from the code element, said processor implementing said super agent executing code comprising, and in a sequential ordering of, the first executable code, the second executable code, and the third executable code; and
   after said executing code, said processor implementing said super agent returning control to the code element.

8. The computer program product of claim 6, wherein the code element provides in the call a scope parameter, and wherein the scope parameter is defined in a data type created by the code element to include the scope parameter and other parameters.

9. The computer program product of claim 8, wherein the second executable code includes an IF/THEN routine responsive to the scope parameter for determining whether to execute a portion of the second executable code defined by the IF/THEN routine.

10. The computer program product of claim 6, said method further comprising:
   said processor presenting a user interface to a programmer, said presented user interface comprising a window that includes an application bar;
   responsive to selection by the programmer of a button in the application bar, said processor displaying a table of contents in the window concurrently with the application bar, said table of contents listing a plurality of options for selection by the programmer;
   responsive to selection by the programmer of an agents option in the table of contents, said processor displaying a listing of agents in the window concurrently with the application bar and the table of contents; and
   responsive to selection by the programmer of an agent specific to the second executable code in the listing of agents, said processor displaying the second executable code in the window and subsequently receiving the second executable code from the programmer to perform said selectively loading the second executable code into the empty routine which results in said converting the empty routine to the populated routine in the first space.

11. A system comprising a processor and a computer readable memory unit coupled to the processor, said memory unit containing program instructions configured to be executed by the processor to implement a method for managing temporary processing agents, said method comprising:

selectively loading, by a processor of a computer system, second executable code into an empty routine which converts the empty routine to a populated routine in a first space, wherein a super agent comprises first agent code that includes first executable code, third agent code that includes third executable code and is located contiguous to the first agent code within a contiguous space within the super agent, and the empty routine consisting of non-executable code in the first space within the super agent external to the contiguous space; and after said selectively loading, said processor repositioning the populated routine between the first agent code and the third agent code to sequentially and contiguously order the first agent code, the populated routine, and the third agent code within the super agent to ensure that a call from a code element to the super agent results in a sequentially ordered execution of the first executable code, the second executable code, and the third executable code.

12. The system of claim 11, said method further comprising:

after said repositioning, said processor implementing said super agent receiving the call from the code element;

responsive to said receiving the call from the code element, said processor implementing said super agent executing code comprising, and in a sequential ordering of, the first executable code, the second executable code, and the third executable code; and after said executing code, said processor implementing said super agent returning control to the code element.

13. The system of claim 11, wherein the code element provides in the call a scope parameter, and wherein the scope parameter is defined in a data type created by the code element to include the scope parameter and other parameters.

14. The system of claim 13, wherein the second executable code includes an IF/THEN routine responsive to the scope parameter for determining whether to execute a portion of the second executable code defined by the IF/THEN routine.

15. The system of claim 11, said method further comprising:

said processor presenting a user interface to a programmer, said presented user interface comprising a window that includes an application bar;

responsive to selection by the programmer of a button in the application bar, said processor displaying a table of contents in the window concurrently with the application bar, said table of contents listing a plurality of options for selection by the programmer;

responsive to selection by the programmer of an agents option in the table of contents, said processor displaying a listing of agents in the window concurrently with the application bar and the table of contents; and responsive to selection by the programmer of an agent specific to the second executable code in the listing of agents, said processor displaying the second executable code in the window and subsequently receiving the second executable code from the programmer to perform said selectively loading the second executable code into the empty routine which results in said converting the empty routine to the populated routine in the first space.

* * * * *